United States Patent
Yamamoto et al.

(10) Patent No.: US 6,797,426 B2
(45) Date of Patent: Sep. 28, 2004

(54) FUEL CELL AND FUEL CELL DEVICE

(75) Inventors: Taizo Yamamoto, Tokyo (JP); Masafumi Kobayashi, Tokyo (JP); Kenji Yamana, Tokyo (JP); Hidemi Kato, Tokyo (JP)

(73) Assignee: Kabushiki Kaisha Equos Research (JP)

( * ) Notice: Subject to any disclaimer, the term of this patent is extended or adjusted under 35 U.S.C. 154(b) by 0 days.

(21) Appl. No.: 09/821,733

(22) Filed: Mar. 30, 2001

(65) Prior Publication Data

US 2001/0041282 A1 Nov. 15, 2001

(30) Foreign Application Priority Data

Mar. 31, 2000 (JP) ........................................ 2000-098419

(51) Int. Cl.⁷ .............................. H01M 8/04; H01M 4/86
(52) U.S. Cl. .......................................... 429/40; 429/41
(58) Field of Search .............................. 429/40, 41, 42

(56) References Cited

U.S. PATENT DOCUMENTS

| | | | | |
|---|---|---|---|---|
| 4,614,025 A | * | 9/1986 | vanOmmering et al. | 439/246 |
| 4,643,957 A | * | 2/1987 | Takeuchi et al. | 429/41 |
| 5,350,643 A | * | 9/1994 | Imahashi et al. | 429/33 |
| 5,500,292 A | | 3/1996 | Muranaka et al. | 429/209 |
| 6,379,827 B1 | * | 4/2002 | Cipollini | 429/13 |

* cited by examiner

Primary Examiner—Carol Chaney
(74) Attorney, Agent, or Firm—Lorusso, Loud & Kelly

(57) ABSTRACT

A fuel cell with enhanced cell output includes a fuel electrode which has a fuel-diffusion layer for diffusing fuel and a fuel-reactive layer for reaction of the fuel; an oxygen electrode which has an oxygen-diffusion layer for diffusing oxygen and an oxygen-reactive layer for reaction of the oxygen; and an electrolyte layer between the fuel electrode and the oxygen electrode. The fuel-reactive layer is in contact with the fuel-diffusion layer, and the oxygen-reactive layer is in contact with the oxygen-diffusion layer. Further, the fuel-diffusion layer has high water-repellency than the oxygen-diffusion layer.

18 Claims, 3 Drawing Sheets

FUEL CELL AND FUEL CELL DEVICE

CROSS-REFERENCE TO RELATED APPLICATIONS

This application claims, under 35 USC 119, priority of Japanese Application No. 2000-98419 filed Mar. 31, 2000.

BACKGROUND OF THE INVENTION

1. Field of the Invention

The present inventions relate to fuel cells and fuel cell devices.

2. Description of the Prior Art

Today, fuel cells are attracting attention as an energy source for the next generation. A fuel cell has two kinds of electrodes, a fuel electrode and an oxygen electrode, and generates electricity by oxidizing fuel at its fuel electrode and reducing oxygen at its oxygen electrode.

SUMMARY OF THE INVENTION

Therefore, an object of the present inventions is to provide fuel cells and fuel cell devices having improved cell output.

The present invention is directed to a fuel cell, comprising:

a fuel electrode which has a fuel-diffusion layer for diffusing fuel;

an oxygen electrode which has an oxygen-diffusion layer for diffusing oxygen; and an electrolyte layer which is arranged between the fuel electrode and the oxygen electrode, wherein the fuel-diffusion layer has higher water-repellency than that of the oxygen-diffusion layer.

Another aspect of the present invention is directed to a fuel cell, comprising:

a fuel electrode which has a fuel-diffusion layer for diffusing fuel and a fuel-reactive layer for reaction of the fuel, the fuel-reactive layer being in contact with the fuel-diffusion layer;

an oxygen electrode which has an oxygen-diffusion layer for diffusing oxygen and an oxygen-reactive layer for reaction of the oxygen, the oxygen-reactive layer being in contact with the oxygen-diffusion layer; and an electrolyte layer which is arranged between the fuel electrode and the oxygen electrode, wherein the fuel-diffusion layer has higher water-repellency than that of the oxygen-diffusion layer.

According to the present invention described above, cell output of fuel cells can be enhanced.

In this invention, it is preferred that each of the fuel-diffusion layer and the oxygen-diffusion layer has at least one water-repellent-material-containing sublayer which contains a material having water repellency, and that the water-repellent-material-containing sublayer of the fuel-diffusion layer has higher water-repellency than that of the oxygen-diffusion layer. In this case, it is preferred that the content of the material having water repellency in the water-repellent-material-containing layer of the fuel-diffusion layer is larger, most preferably at least 5 wt. % larger, than that of the material having water repellency in the water-repellent-material-containing sublayer of the oxygen-diffusion layer.

It is also preferred that the content of the water-repellent material is 20 to 80 wt. % in the water-repellent-material-containing sublayer of the fuel-diffusion layer.

The content of the water-repellent material is preferably 15 to 65 wt. % in the water-repellent-material-containing sublayer of the oxygen-diffusion layer.

It is also preferred that the water-repellent-material-containing sublayer of the fuel-diffusion layer and the water-repellent-material-containing sublayer of the oxygen-diffusion layer both contain a conductive material, and that the conductive material in the water-repellent-material-containing sublayer of the fuel-diffusion layer has higher water-repellency than that of the conductive material in the water-repellent-material-containing sublayer of the oxygen-diffusion layer.

It is also preferred that the water-repellent-material-containing sublayer is a layer in which the water repellency material is carried by a particulate conductive material.

Still further, in this invention, it is also preferred that the fuel-diffusion layer has water-repellent-material-containing sublayers at both its sides.

It is also preferred that the oxygen-diffusion layer has water-repellent-material-containing sublayers at both its sides.

Further, the water contact angle on the surface of the fuel-diffusion layer is preferably larger than the water contact angle on the surface of the oxygen-diffusion layer by at least 5°.

It is also preferred that the water contact angle on the surface of the fuel-diffusion layer is 100 to 160° and that on the surface of the oxygen-diffusion layer is 90 to 150°.

It is preferred that the fuel cell uses hydrogen as fuel.

Another aspect of the present invention is directed to a fuel cell device, comprising a fuel cell as described above.

Further, another aspect of the present invention is directed to a fuel cell device, comprising:

a fuel cell main body which includes (a) a fuel electrode which has a fuel-diffusion layer for diffusing fuel;

(b) an oxygen electrode which has an oxygen-diffusion layer for diffusing oxygen, the fuel-diffusion layer having higher water-repellency than that of the oxygen-diffusion layer; and (c) an electrolyte layer between the fuel electrode and the oxygen electrode; fuel supply means for supplying fuel to the fuel electrode; and oxygen supply means for supplying gas containing oxygen gas to the oxygen electrode.

Preferably, the fuel cell device further comprises water supply means for supplying water to the oxygen electrode.

These and other objects, structures and advantages will be readily apparent from the following description of the preferred embodiments and examples taken in conjunction with the accompanying drawings.

DETAILED DESCRIPTION OF THE PREFERRED EMBODIMENTS

Water balance in the fuel cell is important to the output of a fuel cell. As described above, a fuel cell generates electricity by oxidizing fuel at its fuel electrode and reducing oxygen at its oxygen electrode. Water is generated at the oxygen electrode, and hydrogen ions are generated at the fuel electrode. These hydrogen ions move to the oxygen electrode, transporting water molecules. Therefore, in the fuel cell generating electricity, there is a tendency that water increases in the oxygen electrode, and water decreases in the hydrogen electrode. When the amount of water in the oxygen electrode becomes too large, entry of the oxygen into the oxygen electrode is impeded, and the supply of the oxygen to the oxygen electrode becomes insufficient. Furthermore, when the amount of water in the fuel electrode becomes too small, the efficiency of generating hydrogen ions declines. These phenomena decrease output of the fuel cell.

The present invention seeks to achieve a satisfactory water balance in the fuel cell, i.e., proper amounts of water in both of the oxygen electrode and the fuel electrode to enhance the output of the fuel cell.

Hereinafter, the present invention will be described with reference to the appended drawings.

(1) Overview of a Fuel Cell

Figure 1:
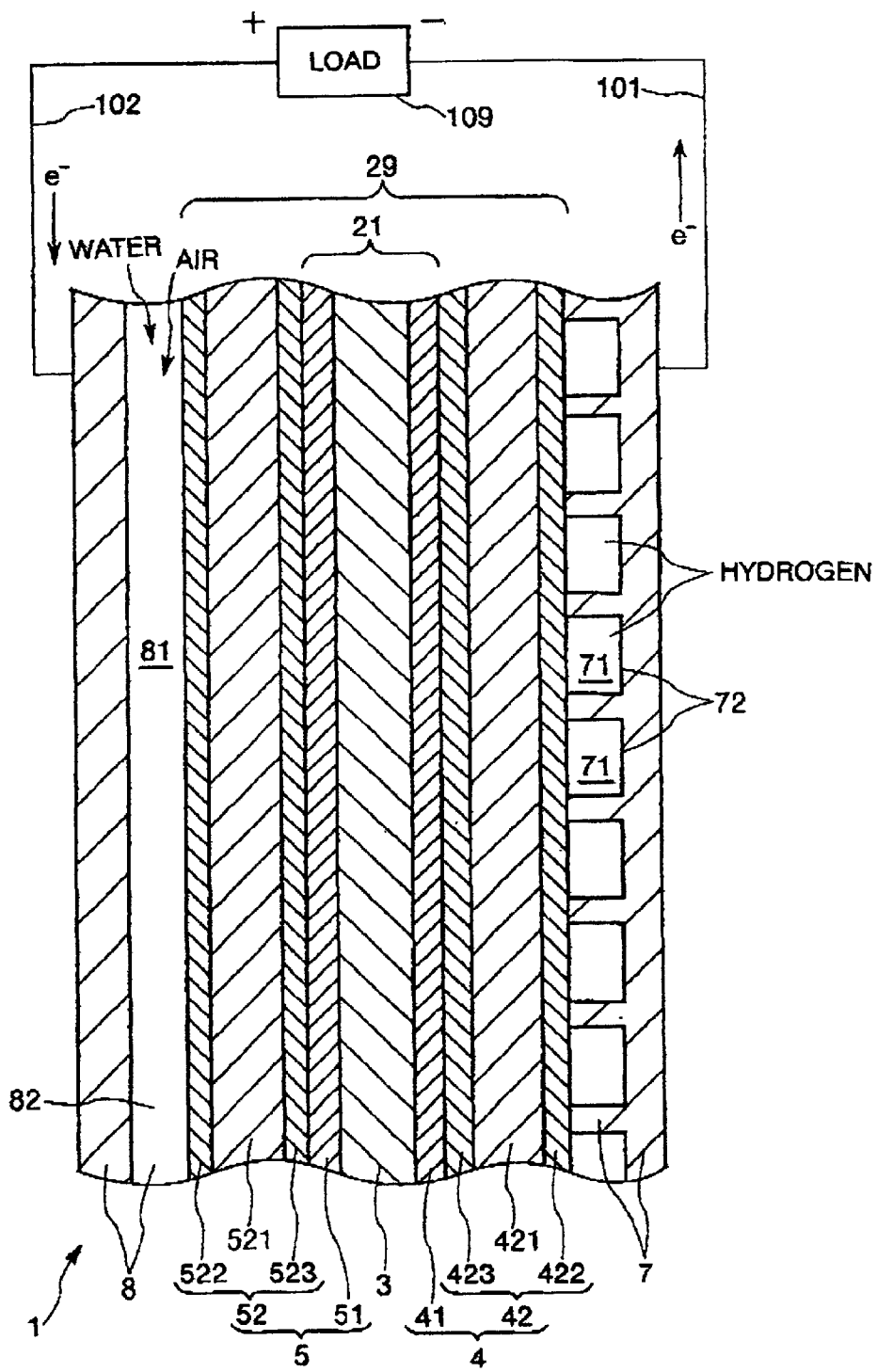
FIG. 1 is a schematic vertical cross-sectional view showing an embodiment of a fuel cell of the present invention.

As shown in FIG. 1, a fuel cell 1 of the present invention has a fuel electrode 4 including a fuel-reactive layer 41 and a fuel-diffusion layer 42, an oxygen electrode 5 including an oxygen-reactive layer 51 and an oxygen-diffusion layer 52, an electrolyte layer 3 that is provided between the fuel electrode 4 and the oxygen electrode 5 and that is in contact with the fuel-reactive layer 41 and the oxygen-reactive layer 51, a fuel-electrode-side cell frame 7 that is in contact with the fuel electrode 4, and an oxygen-electrode-side cell frame 8 that is in contact with the oxygen electrode 5. Moreover, the fuel-diffusion layer 42 has a fuel-diffusion-layer core portion 421, a fuel electrode water-repellent-material-containing outer sublayer 422, and a fuel electrode water-repellent-material-containing inner sublayer 423. Also, the oxygen-diffusion layer 52 has a core portion 521, a water-repellent-material-containing outer sublayer 522, and a water-repellent-material-containing inner sublayer 523.

In the fuel cell 1, the electrolyte layer 3, the fuel-reactive layer 41 joined to one surface of the electrolyte layer 3, and the oxygen-reactive layer 51 joined to the other surface of the electrolyte layer 3 together constitute a reactive portion 21 wherein chemical reactions occur and electricity is generated. The fuel electrode 4, the oxygen electrode 5, and the electrolyte layer 3 provided between the fuel electrode 4 and the oxygen electrode 5 form a layered or "laminated" body 29.

In the present specification, for convenience of description of the fuel cell 1, a position relatively close to the electrolyte layer 3 is referred to as "inner", and a position relatively far from the electrolyte layer 3 is referred to as "outer".

The fuel cell 1 shown in FIG. 1 is a type of a fuel cell that uses hydrogen as fuel, and can generate electricity by oxidizing the hydrogen supplied to the fuel electrode 4 and reducing oxygen in the air supplied to the oxygen electrode 5.

In the fuel cell 1 of the present invention, the water repellency of the fuel-diffusion layer 42 is higher than that of the oxygen-diffusion layer 52. More specifically, in the fuel cell 1 of the present embodiment, the water repellency of the fuel electrode water-repellent-material-containing inner sublayer 423 and outer sublayer 422 is higher than that of the oxygen-electrode water-repellent-material-containing inner sublayer 523 and outer sublayer 522.

With the structure described above, the water balance in the fuel cell 1 can be kept in a state appropriate for generating electricity. In addition, the water repellency of the fuel-diffusion layer 42 and that of the oxygen-diffusion layer 52 keep the water balance in the fuel cell 1 in a state appropriate for generating electricity without increasing electric resistance of the fuel-reactive layer 41 and the oxygen-reactive layer 51.

The various components of the fuel cell 1 will now be described in detail.

(2) Fuel Electrode 4

The fuel electrode (negative electrode; anode) 4 is composed of, in order from the outside, the fuel-diffusion layer 42 having the water-repellent-material-containing outer sublayer 422, the fuel-diffusion-layer core portion 421, and the fuel electrode water-repellent-material-containing inner sublayer 423, with the fuel-reactive layer 41 joined to the fuel-diffusion layer 42.

(2.1) Fuel-Diffusion Layer 42

The fuel-diffusion layer 42 functions to diffuse hydrogen supplied to the fuel electrode 4 and to enhance uniformity of the hydrogen supply to the fuel-reactive layer 41. The fuel-diffusion layer 42 also provides a path for electricity generated in the fuel-reactive layer 41. Moreover, the fuel-diffusion layer 42 plays a role in keeping the water balance in the fuel cell 1 in a state appropriate for generating electricity.

In order to better provide the foregoing functions, in the fuel cell 1 of the present embodiment, at both sides of the fuel-diffusion layer 42 are provided layers containing a water-repellent material.

As shown in FIG. 1, the fuel-diffusion layer 42 has a structure in which water-repellent-material-containing sublayers are respectively provided on both surfaces of the fuel-diffusion-layer core portion (core layer) 421 which is a main portion of the fuel-diffusion layer 42. In the present specification, for convenience of description, the water-repellent-material-containing sublayer provided at the outside of the fuel-diffusion layer 42 is usually referred to as the "fuel electrode water-repellent-material-containing outer sublayer 422", and the water-repellent-material-containing sublayer provided at the inside of the fuel-diffusion layer 42 is usually referred to as the "fuel electrode water-repellent-material-containing inner sublayer 423".

(2.1.1) Fuel-Diffusion-Layer Core Portion 421

The fuel-diffusion-layer core portion 421 constitutes a main portion of the fuel-diffusion layer 42. In this fuel-diffusion-layer core portion 421, hydrogen supplied to the fuel electrode 4 is well diffused. The fuel-diffusion-layer core portion 421 also provides a path for electricity generated in the fuel-reactive layer 41. Moreover, the fuel-diffusion-layer core portion 421 enhances the strength of the fuel cell 1.

The fuel-diffusion-layer core portion 421 is composed of, for example, a porous conductive material represented by a porous carbon material such as carbon fiber fabric (e.g., carbon cloth, carbon felt, or the like), carbon paper, etc.

It is especially preferred that the fuel-diffusion-layer core portion 421 be composed of carbon fiber fabric such as carbon cloth, carbon felt, or the like. The carbon fiber fabric gives excellent hydrogen diffusion and enhances the strength of the fuel cell 1.

The thickness of the fuel-diffusion-layer core portion 421 should preferably be set in a range of about 50 to 2000 $\mu$m and more preferably in a range of about 100 to 800 $\mu$m, though it is not particularly limited. If the fuel-diffusion-layer core portion 421 is too thin, the strength of the fuel cell 1 may be compromised and the fuel-diffusion-layer core portion 421 may not diffuse hydrogen gas efficiently. On the other hand, if the fuel-diffusion-layer core portion 421 is too thick, efficiency of hydrogen gas supply to the fuel-reactive layer 41 may be decreased.

(2.1.2) Fuel-Electrode Water-Repellent-Material-Containing Inner Sublayer 423

The fuel-electrode water-repellent-material-containing inner sublayer 423 plays an important role in adjusting the water repellency of the fuel-diffusion layer 42, in cooperation with the fuel-electrode water-repellent-material-containing outer sublayer 422. Furthermore, the fuel-electrode water-repellent-material-containing inner sublayer 423 provides paths for hydrogen gas and electricity.

From such a viewpoint, the fuel electrode water-repellent-material-containing inner sublayer 423 in the fuel cell 1 of the present embodiment contains a material having water repellency (hydrophobicity) (usually referred to herein as a "water-repellent material") and a conductive material. That the fuel electrode water-repellent-material-containing inner sublayer 423 contains the water-repellent material makes it easy to adjust the water repellency of the fuel-electrode water-repellent-material-containing inner sublayer 423 and also that of the fuel-diffusion layer 42. The fuel-electrode water-repellent-material-containing inner sublayer 423 also contains the conductive material (e.g., a carbon material such as carbon powder) to give the fuel-diffusion layer 42 excellent conductivity.

It is preferable that the fuel-electrode water-repellent-material-containing inner sublayer 423 have the water-repellent material carried by a particulate conductive material (e.g., carbon powder) so as to allow the hydrogen gas to pass therethrough. In the case where the conductive material is particulate, the average particle diameter is preferably in a range of about 0.01 to 0.1 $\mu$m, though not particularly limited.

Examples of the water-repellent material contained in the fuel-electrode water-repellent-material-containing inner sublayer 423 include fluorine materials such as fluorocarbon resins, e.g., polytetrafluoroethylene, tetrafluoroethylene-perfluoroalkylvinylether copolymer, tetrafluoroethylene-hexafluoropropylene copolymer, and the like, and carbon fluoride, silicone resin, polyethylene, polystyrene, etc.

As the water-repellent material used for the fuel-electrode water-repellent-material-containing inner sublayer 423, fluorocarbon resins such as polytetrafluoroethylene, tetrafluoroethylene-perfluoroalkylvinylether copolymer, tetrafluoroethylene-hexafluoropropylene copolymer, and the like are especially preferred because they provide relatively high water-repellency repellency with a relatively low content of the water-repellent material. This situation allows the fuel-electrode water-repellent-material-containing inner sublayer 423 to contain a relatively large amount of conductive material so as to enhance the conductivity of the fuel-diffusion layer 42. In particular, when polytetrafluoroethylene is used as the water-repellent material for the fuel-electrode water-repellent-material-containing inner sublayer 423, hydrogen gas permeability of the fuel electrode water-repellent-material-containing inner sublayer 423 is enhanced.

The thickness of the fuel electrode-inside water-repellent-material-containing layer 423 is preferably in a range of about 2 to 100 $\mu$m and more preferably in a range of about 5 to 50 $\mu$m, though not particularly limited, in order to enhance the above-mentioned functions and effects.

(2.1.3) Fuel-Electrode Water-Repellent-Material-Containing Outer Sublayer 422

As described above, the fuel electrode water-repellent-material-containing outer sublayer 422 plays an important role in adjusting water repellency of the fuel-diffusion layer 42, in cooperation with the fuel electrode water-repellent-material-containing inner sublayer 423. Furthermore, the fuel electrode water-repellent-material-containing outer sublayer 422 provides paths for hydrogen gas and electricity.

The preferred characteristics of the fuel electrode water-repellent-material-containing outer sublayer 422, such as materials, thickness, and the like are the same as those described for the fuel electrode water-repellent-material-containing inner sublayer 423 and, therefore, description is omitted here.

In the fuel cell 1 of the present embodiment, the water repellency of the above-mentioned fuel electrode water-repellent-material-containing inner and outer sublayers 423 and 422 is higher than that of the water-repellent-material-containing sublayers of the oxygen-diffusion layer 52, which is described later in connection with the oxygen electrode 5.

(2.2) Fuel-Reactive Layer 41

The fuel-reactive layer 41 contains a catalyst that promotes oxidation of the hydrogen, or fuel. As necessary, the fuel-reactive layer 41 also contains a carrier supporting the catalyst and ion-exchange resin.

The catalyst may be, for example, a transition metal such as a platinum group metal (platinum (Pt), ruthenium (Ru), rhodium (Rh), palladium (Pd), osmium (Os), iridium (Ir), and the like), gold (Au), etc., alloys of these metals, alloys of these metals and other metals, and so on.

It is especially preferred to use platinum or a platinum alloy as the catalyst of the fuel-reactive layer 41. Platinum and platinum alloys are excellent in promoting hydrogen oxidation and in enhancing cell output.

It is preferable that the above-mentioned catalyst be in the form of fine particles, whereby the specific surface area of the catalyst is increased, and efficiency of the hydrogen oxidation is enhanced. The average particle diameter of the catalyst particles is preferably in a range of about 1 to 1000 nm, though not particularly limited. Furthermore, the specific surface area of the catalyst particles is preferably in a range of about 5 to 300 $m^2/g$. Thereby, efficiency of the hydrogen oxidation is further enhanced.

In the case where the catalyst is in the form of particles, it is recommended that the catalyst be carried (supported) by a carrier (support).

The catalyst carrier may be, for example, a carbon material such as carbon powder or the like. Carbon material is an excellent catalyst carrier. Furthermore, if the catalyst is supported by a carbon material, the conductivity of the fuel-reactive layer 41 is enhanced, so that the internal resistance of the fuel cell 1 is decreased. Therefore, the output of the fuel cell 1 is augmented.

In the case where a particulate carrier such as carbon powder is used to support the catalyst, its average particle diameter is preferably in a range of about 0.01 to 1 $\mu$m, whereby the catalyst exhibits excellent catalytic activity.

It is preferable that the fuel-reactive layer 41 contain ion-exchange resin, whereby hydrogen ions generated in the fuel-reactive layer 41 can move smoothly into the electrolyte layer 3. The ion-exchange resin may be the same as that previously described in connection with the electrolyte layer 3. Therefore, the fuel cell 1 can generate electricity more efficiently.

The amount of catalyst in the fuel-reactive layer 41 is preferably in a range of about 1 to 80 wt % and, more preferably, in a range of about 10 to 50 wt %, though the content varies slightly depending upon the kind of catalyst, the presence/absence and type of auxiliary components such as the carrier, ion-exchange resin, etc. If the content of the catalyst is too small, the fuel-reactive layer 41 may not be able to sufficiently oxidize hydrogen, and its cell output may be decreased.

In the case where the fuel-reactive layer 41 contains a carrier supporting the catalyst, the content of the carrier in the fuel-reactive layer 41 is preferably in a range of about 5 to 60 wt % and more preferably in a range of about 10 to 40 wt %, though the content varies slightly depending upon the type, content, etc., of the catalyst. Thereby, the carrier can carry the catalyst more satisfactorily and the conductivity of the fuel-reactive layer 41 can be enhanced.

In the case where the fuel-reactive layer 41 contains a ion-exchange resin, the amount of the ion-exchange resin is preferably in a range of about 5 to 60 wt % and more preferably in a range of about 10 to 40 wt %, though the content varies slightly depending upon the type, content, etc., of the catalyst. Thereby, hydrogen ions can move more smoothly into the electrolyte layer 3.

The thickness of the fuel-reactive layer 41 is preferably in a range of about 1 to 100 $\mu$m, more preferably in a range of about 1 to 50 $\mu$m though it varies slightly depending upon the materials composing the fuel-reactive layer 41. If the fuel-reactive layer 41 is too thick, it may impede movement of hydrogen, hydrogen ions, and the like in the fuel-reactive layer 41.

(3) Electrolyte Layer 3

The electrolyte layer 3 contains an electrolyte, and functions as a transport medium for hydrogen ions.

The electrolyte layer 3 can be composed of, for example, ion-exchange resin (solid electrolyte) such as Nafion (Trademark), a water-retaining material (e.g., woven fabric, nonwoven fabric, paper, and the like) carrying (impregnated with) an electrolyte solution such as sulfuric acid or the like.

In the fuel cell 1 of the present invention, if the electrolyte layer 3 is composed of an ion-exchange resin, the cell output of the fuel cell 1 is especially enhanced.

The thickness of the electrolyte layer 3 is preferably in a range of about 1 to 1000 $\mu$m and more preferably in a range of about 10 to 100 $\mu$m, though not particularly limited. If the electrolyte layer 3 is too thick, it may impede movement of the hydrogen ions in the electrolyte layer 3, and may decrease the cell output. In contrast, if the electrolyte layer 3 is too thin, hydrogen may markedly permeate into the oxygen electrode 5 and a decrease of output voltage may result. Furthermore, in this case, the mechanical strength of the layered body 29 may be relatively reduced. Therefore, if such a fuel cell 1 is installed in a vehicle or the like, the electrolyte layer 3 may rupture due to vibration.

(4) Oxygen Electrode 5

The oxygen electrode (positive electrode; cathode) 5 is composed of, in order from the outside, the oxygen-diffusion layer 52 which includes the oxygen electrode water-repellent-material-containing outer sublayer 522, the oxygen-diffusion-layer core portion 521, and the oxygen electrode water-repellent-material-containing inner sublayer 523, and the oxygen-reactive layer 51 joined to the oxygen-diffusion layer 52.

(4.1) Oxygen-Diffusion Layer 52

The oxygen diffusion layer 52 functions to diffuse oxygen supplied to the oxygen electrode 5 and thereby increase uniformity of the oxygen supply to the oxygen-reactive layer 51. The oxygen-diffusion layer 52 also provides a path for electricity to the oxygen-reactive layer 51. Moreover, the oxygen-diffusion layer 52 plays a role in keeping the water balance in the fuel cell 1 in a state appropriate for generating electricity, in cooperation with the fuel-diffusion layer 42.

If both sides of the oxygen-diffusion layer 52 are provided with sublayers containing a water-repellent material, the above-mentioned effects can be obtained more effectively.

As shown in FIG. 1, the oxygen-diffusion layer 52 has a structure in which water-repellent-material-containing sublayers are respectively provided on both surfaces of the oxygen-diffusion-layer core portion (core layer) 521, which is a main portion of the oxygen-diffusion layer 52. In the present specification, for convenience of description, the water-repellent-material-containing layer provided at the outside of the oxygen-diffusion layer 52 is usually referred to as the "oxygen electrode water-repellent-material-containing outer sublayer 522", and the water-repellent-material-containing layer provided at the inside of the oxygen-diffusion layer 52 is usually referred to as the "oxygen electrode water-repellent-material-containing inner sublayer 523".

(4.1.1) Oxygen-Diffusion-Layer Core Portion 521

The fuel-diffusion-layer core portion 521 constitutes a main portion of the oxygen-diffusion layer 52. This oxygen-diffusion-layer core portion 521 diffuses oxygen supplied to the oxygen electrode 5 and also provides a path for electricity to the oxygen-reactive layer 51. Moreover, the oxygen-diffusion-layer core portion 521 increases the strength of the fuel cell 1.

The preferred characteristics of the oxygen-diffusion-layer core portion 521, such as materials, thickness, and the like are the same as those described in connection with the fuel-diffusion-layer core portion 421 and, therefore, their description is omitted here.

(4.1.2) Oxygen-Electrode Water-Repellent-Material-Containing Inner Sublayer 523

The oxygen electrode water-repellent-material-containing inner sublayer 523 plays an important role in adjusting the water repellency of the oxygen-diffusion layer 52, in cooperation with the oxygen electrode water-repellent-material-containing outer sublayer 522. Furthermore, the oxygen electrode water-repellent-material-containing outer sublayer 523 provides paths for oxygen gas and electricity.

The preferred characteristics except for those described later, such as materials, thickness, and the like of the oxygen electrode water-repellent-material-containing inner sublayer 523 are same as those described in connection with the fuel electrode water-repellent-material-containing inner sublayer 423 and therefore, their description is omitted here.

(4.1.3) Oxygen Electrode Water-Repellent-Material-Containing Outer Sublayer 522

As described above, the oxygen electrode water-repellent-material-containing outer sublayer 522 plays an important role in adjusting water repellency of the oxygen-diffusion layer 52, in cooperation with the oxygen electrode water-repellent-material-containing inner sublayer 523. Furthermore, the oxygen electrode water-repellent-material-containing outer sublayer 522 provides paths for oxygen gas and electricity.

The preferred characteristics of the oxygen electrode water-repellent-material-containing outer sublayer 522, such as materials, the thickness, and the like are the same as those described in connection with the oxygen electrode water-repellent-material-containing inner sublayer 523 and therefore, their description is omitted here.

As described above, in the fuel cell 1 of the present embodiment, the water repellency of the oxygen electrode water-repellent-material-containing sublayers 522 and 523 is lower than that of the fuel electrode water-repellent-material-containing outer and inner sublayers 422 and 423.

(4.2) Oxygen-Reactive Layer 51

The oxygen-reactive layer 51 contains a catalyst that promotes oxygen reduction and, as necessary, a carrier supporting the catalyst and an ion-exchange resin.

The catalyst may be, for example, a transition metal such as a platinum group metal (platinum (Pt), ruthenium (Ru), rhodium (Rh), palladium (Pd), osmium (Os), iridium (Ir), or the like), gold (Au), etc., alloys of these metals, alloys of these metals and other metals, and so on.

It is especially preferred to use platinum or a platinum alloy as the catalyst of the oxygen-reactive layer 51 because of their excellence in promoting oxygen reduction. Therefore, if platinum or the platinum alloy is used as the catalyst of the oxygen electrode 5, the fuel cell 1 can reduce oxygen efficiently in the oxygen electrode 5, and cell output will be enhanced.

It is preferred that the above-mentioned catalyst be in the form of fine particles, whereby the specific surface area of the catalyst is increased, and efficiency of the oxygen reduction is enhanced. In this case, the preferred characteristics of the catalyst, i.e., average particle diameter, specific surface area, and the like, of the oxygen-reactive layer 51 are same as those described in connection with the fuel-reactive layer 41.

In the case where the catalyst is in the form of particles, it is recommended that it be supported by a carrier, whereby the oxygen-reactive layer 51 can better hold the catalyst. The description of the carrier in connection with the fuel-reactive layer 41 also applies to this carrier.

It is preferable that the oxygen-reactive layer 51 also contains ion-exchange resin, whereby, hydrogen ions can move smoothly from the electrolyte layer 3 into the oxygen-reactive layer 51. Therefore, the fuel cell 1 can generate electricity more efficiently. The description of the ion-exchange resin in connection with the fuel-reactive layer 41 also applies to this ion-exchange resin.

The preferred characteristic conditions of the oxygen-reactive layer 51, such as contents of the catalyst, the carrier, ion-exchange resin content, thickness, etc., are the same as those described in connection with the fuel-reactive layer 41 and therefore, their description is omitted here.

(4.3) Difference of the Water-Repellency Between the Fuel-Diffusion Layer 42 and the Oxygen-Diffusion Layer 52

(4.3.1)

As previously described The fuel cell 1 generates electricity by oxidizing fuel in the fuel-reactive layer 41 and reducing oxygen in the oxygen-reactive layer 51, and water is generated in the oxygen-reactive layer 51. In addition, hydrogen ions are generated in the fuel-reactive layer 41, which hydrogen ions move into the oxygen-reactive layer 51 through the electrolyte layer 3, carrying water molecules.

Therefore, while the fuel cell 1 is running, there is a tendency that water decreases in the fuel-reactive layer 41 and water increases in the oxygen-reactive layer 51. However, when the amount of water becomes excessive in the oxygen-reactive layer 51, movement of oxygen into the oxygen-reactive layer 51 from the oxygen-diffusion layer 52 is impeded. In other words, when the amount of water in the oxygen-reactive layer 51 becomes too large, the supply oxygen to the oxygen-reactive layer 51 is inhibited. In addition, when the amount of water becomes too small in the fuel-reactive layer 41, efficiency of generating hydrogen ions is decreased.

Therefore, the fuel cell 1 can generate electricity more efficiently if the amount of water in the oxygen-reactive layer 51 is prevented from excessively increasing and the amount of water in the fuel-reactive layer 41 is prevented from excessively decreasing.

In the fuel cell 1 of the present invention, the water repellency of the fuel-diffusion layer 42 should be higher than that of the oxygen-diffusion layer 52 so that water in the oxygen-reactive layer 51 is encouraged to pass through the oxygen-diffusion layer 52 and to be discharged efficiently out of the oxygen electrode 5. In addition, water in the fuel-reactive layer 41 is inhibited from entering and passing through the fuel-diffusion layer 42. Therefore, there is a tendency that larger amounts of water accumulate in the fuel-reactive layer 41.

Accordingly, in the fuel cell 1 of the present invention, the amount of water in the oxygen-reactive layer 51 is prevented from being excessively increased, and the amount of water in the fuel-reactive layer 41 is prevented from being excessively decreased. Therefore, in the fuel cell 1 of the present invention, reactions in the fuel-reactive layer 41 and the oxygen-reactive layer 51 are facilitated and cell output is thereby enhanced.

Furthermore, the water repellency of the fuel-diffusion layer 42 and that of the oxygen-diffusion layer 52 can be set so that the water balance in the fuel cell 1 can be kept in a finely adjusted state even if the water repellencies of the fuel-reactive layer 41 and the oxygen-reactive layer 51 are not strictly adjusted.

Generally, fuel-reactive layers and oxygen-reactive layers contain an ion-exchange resin. Therefore, for example, if the fuel-reactive layer and the oxygen-reactive layer additionally contain a water-repellent material so as to adjust their water repellencies, the conductivity of the fuel-reactive layer and the oxygen-reactive layer would diminish. Therefore, the internal resistance of the fuel cell would increase so that cell output would diminish.

It is usually unnecessary for fuel-diffusion layers and oxygen-diffusion layers to contain a material which decreases conductivity and such material is generally contained in the fuel-reactive layers and the oxygen-reactive layers. Thus, for example, even if the fuel-diffusion layer and the oxygen-diffusion layer contain a water-repellent material so as to adjust the water repellencies of the fuel-diffusion layer and the oxygen-diffusion layer, the electric resistances of the fuel-diffusion layer and the oxygen-diffusion layer are prevented from being excessively increased.

Thus, if the water repellency of the fuel-diffusion layer 42 is higher than that of the oxygen-diffusion layer 52, as in the fuel cell 1 of the present invention, the water balance in the fuel cell 1 can be kept in a state appropriate for generating electricity without an enormous increase in the internal resistance of the fuel cell 1. It should be noted that addition of water-repellent materials to the fuel-reactive layer 41 and/or the oxygen-reactive layer 51 to provide a difference between water repellency of the fuel-reactive layer 41 and that of the oxygen-reactive layer 51 is not excluded from the present invention.

(4.3.2) Difference Between the Water-Repellent-Material-Containing Sublayer in the Fuel-Diffusion Layer 42 and that of the Oxygen-Diffusion Layer 52

In this section, in the interest of conciseness and clarity, it is assumed that, while the following description of fuel electrode refers to the water-repellent-material-containing inner sublayer 423 it is equally applicable to the fuel electrode water-repellent-material-containing outer sublayer 422, and that the reference to the oxygen electrode water-repellent-material-containing inner sublayer 522 is equally applicable to the oxygen electrode water-repellent-material-containing outer sublayer 522.

It is recommended that the difference between the water repellency of the fuel-diffusion layer 42 and that of the oxygen-diffusion layer 52 be realized by providing a difference between the water repellency of the fuel electrode water-repellent-material-containing inner sublayer 423 and that of the oxygen electrode water-repellent-material-containing inner sublayer 523. In this manner, it becomes easy to adjust the water repellency of the fuel-diffusion layer 42 and the oxygen-diffusion layer 52 and thereby to adjust the water balance in the fuel cell 1 so as to generate electricity smoothly and efficiently. In addition, increase of the electric resistance of the entire fuel-diffusion layer 42 and the entire oxygen-diffusion layer 52 is well suppressed.

For example, in the fuel cell 1, the water repellency of the fuel electrode water-repellent-material-containing inner sublayer 423 can be made higher than that of the oxygen electrode water-repellent-material-containing inner sublayer 523 by making the content of the water-repellent material in the fuel electrode water-repellent-material-containing inner sublayer 423 higher than that in the oxygen electrode water-repellent-material-containing inner sublayer 523. The content of the water-repellent material in the sublayer 423 is preferably higher than that in the sublayer 523 by at least 5 wt %, more preferably by at least 10 wt %, and most preferably by at least 12.5 wt %. In this manner, it becomes easy to adjust the water repellency of the sublayers 423 and 523 and the water balance in the fuel cell 1 becomes more suitable for generating electricity. Thus, an excessive increase in the amount of water in the oxygen-reactive layer 51 can be satisfactorily prevented, and an excessive decrease in the amount of water in the fuel-reactive layer 41 can also be satisfactorily prevented.

The content of the water-repellent material in the fuel electrode water-repellent-material-containing inner sublayer 423 is preferably in a range of about 20 to 80 wt %. more preferably in a range of about 30 to 70 wt %, and most preferably in a range of about 45 to 65 wt %. Thereby, the fuel-reactive layer 41 can hold an amount of water that is suitable for generating hydrogen ions efficiently and more satisfactorily.

Furthermore, the content of the water-repellent material in the oxygen electrode water-repellent-material-containing inner sublayer 523 is preferably in a range of about 15 to 65 wt %, more preferably in a range of about 25 to 55 wt %, and most preferably in a range of about 30 to 50 wt %. Thereby, the oxygen-reactive layer 51 can better discharge extra water.

The water-repellency of the fuel electrode water-repellent-material-containing inner sublayer 423 can also be made higher than that of the oxygen electrode water-repellent-material-containing inner sublayer 523 by incorporating water-repellent material into sublayer 423 having a higher degree of water-repellency than that of the conductive material contained in the sublayer 523. In this manner, the water repellency of the fuel electrode water-repellent-material-containing inner sublayer 423 and the oxygen electrode water-repellent-material-containing inner sublayer 523 can be adjusted while suppressing increase of the electric resistance.

The degree of the water repellency of the conductive material corresponds to the relative amounts of hydrophilic groups and hydrophobic groups contained therein.

It is preferable that the thickness of the fuel electrode water-repellent-material-containing inner sublayer 423 is larger than that of the oxygen electrode water-repellent-material-containing inner sublayer 523, whereby, in the fuel electrode 4, the water tends to stay in the fuel-reactive layer 41 more satisfactorily, and in the oxygen electrode 5 the water tends to be better discharged from the oxygen-reactive layer 51. More preferably, it is preferred that the thickness of the fuel electrode water-repellent-material-containing inner sublayer 423 is larger by at least 5 $\mu$m than that of the sublayer 523. Alternatively, the thickness of the sublayer 423 may be the same or less than that of the sublayer 523.

In the case where the sublayers 423 and 523 are porous, it is preferable that the porosity of the inner sublayer 423 be lower than that of the inner sublayer 523, whereby the water tends to be better retained in the fuel-reactive layer 41, and in the oxygen electrode 5, unnecessary water tends to be better discharged from the oxygen-reactive layer 51. More preferably the porosity of the sublayer 423 is lower by at least 5% than that of the sublayer 523. Of course, alternatively, the porosity of the sublayer 423 may be the same as or higher than that of the sublayer 523.

In the case where the fuel electrode water-repellent-material-containing inner sublayer 423 is porous, the porosity is preferably in a range of about 20 to 70% and more preferably in a range of about 35 to 55%. Furthermore, in the case where the oxygen electrode water-repellent-material-containing inner sublayer 523 is porous, the porosity is preferably in a range of about 30 to 80% and more preferably in a range of about 45 to 65%.

Transport of the hydrogen through the sublayer 423 is enhanced if the sublayer 423 is made porous. Furthermore, transport of oxygen through the sublayer 523 is enhanced, if the sublayer 523 is porous. Of course, the porosity of the sublayers 423 and 523 need not be within above-mentioned ranges.

The water contact angle on the surface of the fuel-diffusion layer 42 should be larger than that on the surface of the oxygen-diffusion layer 52, preferably by at least 5° and more preferably by at least 10°. Further, the water contact angle on the surface of the fuel-diffusion layer 42 is preferably in a range of about 100 to 160° and more preferably in a range of about 130 to 150°, whereby, the fuel-diffusion layer 42 allows water to be better retained in the fuel-reactive layer 41.

Moreover, the water contact angle on the surface of the oxygen-diffusion layer 52 is preferably in a range of about 90 to 150° and more preferably in a range of about 110 to 130°, whereby, the oxygen-diffusion layer 52 can discharge water more satisfactorily.

In the fuel-diffusion layer 42, the water repellency of the fuel electrode water-repellent-material-containing inner sublayer 423 can be set equal to or different from that of the fuel electrode water-repellent-material-containing outer sublayer 422. Furthermore, in the oxygen-diffusion layer 52, the water repellency of the oxygen electrode water repellent-material-containing inner sublayer 523 can be equal to or different from that of the oxygen electrode water-repellent-material-containing outer sublayer 522.

Assuming that F2 represents the water repellency of the fuel electrode water-repellent-material-containing outer sublayer 422, F3 represents the water repellency of the fuel electrode water-repellent-material-containing inner sublayer 423, 02 represents the water repellency of the oxygen electrode water-repellent-material-containing layer outer sublayer 522, and 03 represents the water repellency of the fuel electrode water-repellent-material-containing inner sublayer 523, the relationships of the water repellencies among these four sublayers may be expressed as follows: $F2=F3>03=02$, $F2 \geq F3>03>02$, $F3>F2>03 \geq 02$, $F2 \geq F3>02>03$, $F3>F2>02>03$. Of course, the relationships of the water repellencies among these four sublayers may be other than the foregoing.

Where the fuel-diffusion layer 42 has plural water-repellent-material-containing sublayers, the "water repellency of a water-repellent-material-containing layer" of the fuel-diffusion layer 42 is taken as the average water repellency of the water-repellent material containing sublayers. Likewise, where the oxygen-diffusion layer 52 has plural water-repellent-material-containing sublayers, the "water repellency of the water-repellent-material containing sublayer" of the oxygen-diffusion layer 52 is taken as the average of the water repellency of the water-repellent-material-containing sublayers.

The water repellency of the fuel-diffusion layer 42 may also be made higher than that of the oxygen-diffusion layer 52 by a difference between the water repellency of the fuel-diffusion-layer core portion 421 and that of the oxygen-diffusion-layer core portion 521.

(5) Cell Frame

Two cell frames (separators) are provided with the layered body 29 interposed therebetween. More specifically, the fuel-electrode-side cell frame 7 and the oxygen-electrode-side cell frame 8 are in contact with the fuel electrode 4 and the oxygen electrode 5, respectively, and thereby support the layered body 29.

The fuel-electrode-side cell frame 7 is shaped, for example, as a board having plural, parallel grooves with rectangular traverse cross-sectional shapes. As shown in FIG. 1, the fuel-electrode-side cell frame 7 is arranged with its side having the grooves 72 facing the fuel electrode 4. In the fuel cell 1, flow paths 71 for hydrogen are formed by the grooves 72, whereby hydrogen is supplied to the fuel electrode 4.

Portions of the frame 7 between the grooves 72 are in contact with the fuel electrode 4, more specifically, in contact with the fuel electrode water-repellent-material-containing outer sublayer 422. The fuel-electrode-side cell frame 7 is made of, for example, a conductor such as a carbon-containing resin or the like. Thus, the fuel-electrode-side cell frame 7 can function as a negative electrode side terminal. Therefore, in the fuel cell 1, if wiring 101 is connected to the fuel-electrode-side cell frame 7, the wiring 101 becomes electrically connected with the fuel electrode 4.

The oxygen-electrode-side cell frame 8 has the same shape as that of the fuel-electrode-side cell frame 7. Grooves 82 formed on the oxygen-electrode-side cell frame 8 serve as flow paths 81 for air supplied to the oxygen electrode 5. Portions of the frame 8 between the grooves 82 are in contact with the oxygen electrode 5, more specifically in contact with the oxygen electrode water-repellent-material-containing outer sublayer 522.

The oxygen-electrode-side cell frame 8 is made of, for example, the same material as that of the fuel-electrode-side cell frame 7. Thus, the oxygen-electrode-side cell frame 8 can function as a positive electrode side terminal. Therefore, if wiring 102 is connected to the oxygen-electrode-side cell frame 8, the wiring 102 becomes electrically connected with the oxygen electrode 5.

As shown in FIG. 1, the fuel-electrode-side cell frame 7 and the oxygen-electrode-side cell frame 8 are arranged with their grooves almost orthogonal to each other. In FIG. 1, the flow paths 71 extend in a direction perpendicular to the drawing surface, and the flow paths 81 extend up-and-down parallel to the drawing surface.

Alternatively, the grooves 72 and the grooves 82 may be arranged other than orthogonal to each other.

Optionally, the cell frames may be omitted.

(6) Operation of the Fuel Cell 1

First, one end of the wiring 101 is connected to the fuel-electrode-side cell frame 7, and one end of the wiring 102 is connected to the oxygen-electrode-side cell frame 8. The other ends of the wiring 101 and the wiring 102 are connected to a load 109.

Then, hydrogen gas is introduced into the flow paths 71, and air is introduced into the flow paths 81. Furthermore, liquid water (coolant) is introduced into the flow paths 81. In FIG. 1, the hydrogen gas flows in a direction perpendicular to the drawing surface, and the air and water flow in an up-and-down direction parallel to the drawing surface. The amount of water supplied is preferably in a range of about 0.1 to 1.0 mg/cm$^2$ sec, though not particularly limited.

It is preferable that the hydrogen gas be supplied under pressure, whereby the efficiency of hydrogen gas utilization is enhanced. The supply pressure of the hydrogen is preferably in a range of about 0.5 to 1 kgf/cm$^2$. However, the hydrogen gas need not be supplied under pressure.

When the hydrogen gas is introduced into the flow paths 71, the hydrogen is supplied to the surface of the fuel electrode 4. Then, the hydrogen enters the fuel-diffusion layer 42 from the fuel electrode water-repellent-material-containing outer sublayer 422, passes through the fuel-diffusion layer 42 and thus diffused reaches the fuel-reactive layer 41.

When air is introduced into the flow paths 81, oxygen is supplied to the surface of the oxygen electrode 5. Then, the oxygen enters the oxygen-diffusion layer 52 from the oxygen electrode water-repellent-material-containing outer sublayer 522. Then, the oxygen passes through the oxygen-diffusion layer 52 and thus diffused reaches the oxygen-reactive layer 51.

When water is introduced into the flow paths 81, it reaches the surface of the oxygen electrode 53 but it is basically prevented from entering the oxygen electrode 5. Because the water molecules flowing in the flow paths 81 are in the form of large aggregates (so-called large clusters), it is difficult for the water to pass through the sublayer 522 that has water repellency.

In the present invention, the layer containing the water-repellent material sublayer 522 is provided at the surface of the electrode (oxygen electrode 5) to which water is supplied. Therefore, in the fuel cell 1, a large amount of water is not apt to adhere to the surface of the oxygen electrode 5 and the oxygen can easily enter the oxygen electrode 5.

When hydrogen (H$_2$) is supplied to the fuel-reactive layer 41, the following reaction occurs in the fuel-reactive layer 41 by the action of the catalyst.

$$H_2 \rightarrow 2H^+ + 2e^- \qquad (i)$$

At this time, electrons (e$^-$) generated in the fuel-reactive layer 41 move from the fuel-reactive layer 41 into the oxygen-reactive layer 51 through the fuel-diffusion layer 42, the fuel-electrode-side cell frame 7, the wiring 101, the load 109, the wiring 102, the oxygen-electrode-side cell frame 8, and the oxygen-diffusion layer 52, thereby providing energy to the load 109.

Furthermore, hydrogen ions (H$^+$) generated in the fuel-reactive layer 41 move from the fuel-reactive layer 41 into the oxygen-reactive layer 51 through the electrolyte layer 3.

In the oxygen-reactive layer 51, from the oxygen (O$_2$) supplied from the flow paths 81, the electrons introduced through the wiring, and the hydrogen ions having moved through the electrolyte layer 3, the following reaction occurs by the action of the catalyst.

$$(\tfrac{1}{2})O_2 + 2H^+ + 2e^- \rightarrow H_2O \qquad (ii)$$

At this time, due to the difference in water pressure between the oxygen-reactive layer 51 and the oxygen-diffusion layer 52, capillary action, etc., much of the generated water ($H_2O$) moves from the oxygen-reactive layer 51 through the oxygen-diffusion layer 52 and is discharged from the surface of the oxygen electrode 5 (the surface of oxygen-electrode-outside sublayer 522). In this case, since water molecules passing through the oxygen-diffusion layer 52 do not form aggregates, or, alternatively, even if the water molecules form aggregates, their size is small and they can pass smoothly through the sublayers 523 and 522.

Going back slightly, referring to the above equation (I), the hydrogen ions generated in the fuel-reactive layer 41 move from the fuel-reactive layer 41 into the oxygen-reactive layer 51 through the electrolyte layer 3. At this time, the migrating hydrogen ions carry water molecules. Therefore, in the fuel-reactive layer 41, the amount of water tends to decrease. However, when the amount of water in the fuel-reactive layer 41 decreases to some degree, the water begins to move back from the oxygen-reactive layer 51 into the fuel-reactive layer 41 due to the difference in water concentration between the oxygen-reactive layer 51 and the fuel-reactive layer 41. In addition, in the fuel cell 1 of the present invention, the water in the fuel-reactive layer 41 is not apt to diffuse into the fuel-diffusion layer 42 and thus layer 41, and thus there is no large decrease in the amount of water.

Consequently, because of the above-mentioned effects, in the fuel cell 1 of the present invention, the amount of water in the oxygen-reactive layer 51 is not apt to become too large, and the amount of water in the fuel-reactive layer 41 is not apt to become too small. Therefore, the fuel cell 1 can generate electricity efficiently, with an augmented cell output.

Due to the reactions (i) and (ii), heat is generated in the layered body 29, but the layered body 29 is efficiently cooled by the water supplied to the flow paths 81.

Although in the above description, water is supplied to the oxygen electrode 5, water may be supplied to the fuel electrode 4. Furthermore, water need not be supplied to the fuel cell 1 at all.

In the above description, although air is supplied to the oxygen electrode 5, gas other than the air, such as pure oxygen gas, may be supplied to the oxygen electrode 5 as long as the gas contains oxygen molecules.

(7) Method of Producing the Fuel Cell 1

The layered body 29 of the above-described fuel cell 1 can be produced, for example, by the process of preparing the electrolyte layer 3, laminating the fuel electrode 4 on one surface of the electrolyte layer 3, and laminating the oxygen electrode 5 on its other surface.

(7.1) Producing the Fuel Electrode 4

First, the fuel-diffusion-layer core portion 421 is prepared. Next, the fuel-diffusion layer 42 is obtained by forming the fuel electrode water-repellent-material-containing outer sublayer 422 and the fuel electrode water-repellent-material-containing inner sublayer 423 on the opposing surfaces of the fuel-diffusion-layer core portion 421, respectively. The water-repellent-material-containing sublayers can be formed, for example, by coating constituent materials of the sublayers onto the fuel-diffusion-layer core portion 421, followed by drying with application of heat and pressure. In this case, the heating temperature is preferably in a range of about 330 to 400° C., though not particularly limited. Furthermore, the applied pressure is preferably in a range of about 20 to 100 kg/cm², though not particularly limited.

Next, the fuel-reactive layer 41 is formed on the fuel electrode water-repellent-material-containing inner sublayer 423 so as to obtain the fuel electrode 4. The fuel-reactive layer 41 can be formed, for example, by coating constituent materials of the fuel-reactive layer 41 onto the sublayer 423, followed by drying.

(7.2) Producing the Oxygen Electrode 5

The oxygen electrode 5 can be produced by the same method as that described above for producing the fuel electrode 4.

(7.3) Producing the Layered Body 29

The layered body (layered unit) 29 can be produced by laminating the fuel electrode 4 on one surface of the electrolyte layer 3 and laminating the oxygen electrode 5 on the other surface of the electrolyte layer 3, whereby the fuel-reactive layer 41 comes into contact with the electrolyte layer 3 and the oxygen-reactive layer 51 comes into contact with the electrolyte layer 3.

For example, the fuel electrode 4, the electrolyte layer 3, and the oxygen electrode 5 may be laminated to one another by stacking the fuel electrode 4, the electrolyte layer 3, and the oxygen electrode 5, in this order, and applying heat and pressure to the stack. In this case, the heating temperature is preferably in a range of about 120 to 180° C., though not particularly limited. Furthermore, the applied pressure is preferably in a range of about 20 to 100 kg/cm², though not particularly limited.

(7.4)

Thereafter, the fuel cell 1 as shown in FIG. 1 can be obtained by pinching the layered body 29 (fuel electrode 4 and the oxygen electrode 5) between the fuel-electrode-side cell frame 7 and the oxygen-electrode-side cell frame 8.

Thus far the fuel cell of the present invention has been described in terms of one embodiment shown in the drawings, but the present invention is not limited thereto. For example, in the fuel-diffusion layer, the water-repellent-material-containing sublayer may be provided only on one surface of the fuel-diffusion sublayer. Furthermore, for example, in the oxygen-diffusion layer, the water-repellent-material-containing sublayer may be provided only on one surface of the oxygen-diffusion sublayer. Moreover, for example, a separate water-repellent-material-containing sublayer need not be provided.

In the above-described embodiment, hydrogen is used as fuel, but, for example, methanol, hydrazine, or the like may be used as fuel.

(8) Fuel Cell Device

Hereinafter, an embodiment of a fuel cell device employing the fuel cell 1 will be described with reference to FIG. 2.

Figure 2:
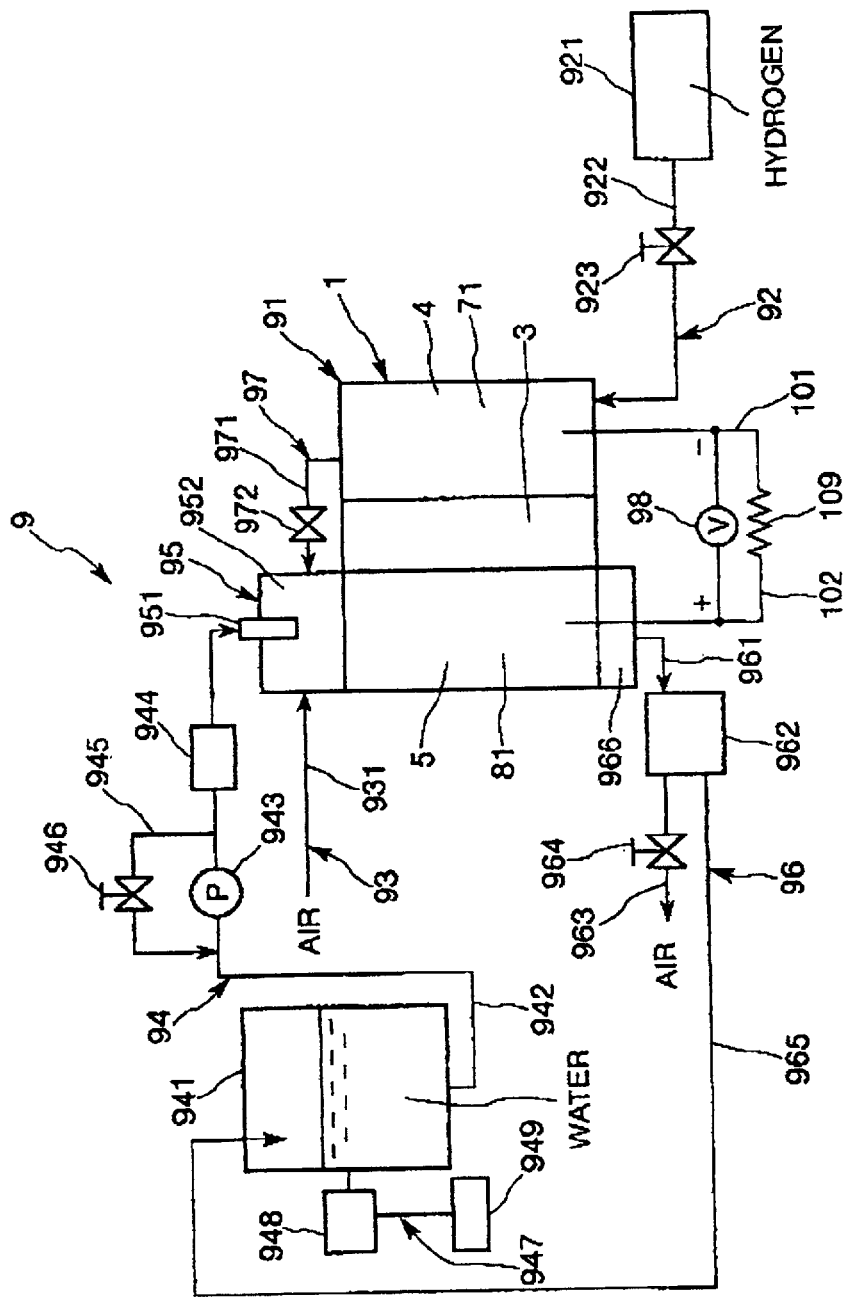
FIG. 2 is a schematic diagram showing an embodiment of a fuel cell device of the present invention, including the fuel cell of FIG. 1.

A fuel cell device 9 is shown in FIG. 2 as including a fuel cell 1 described above. This fuel cell device 9 can generate electricity by supplying fuel and oxygen to the fuel cell 1.

As shown in FIG. 2, the fuel cell device 9 has a cell unit 91 accommodating the fuel cell 1, fuel supply means 92 for supplying hydrogen (fuel) to the fuel electrode 4 of the fuel cell 1, oxygen supply means 93 for supplying air (a gas containing oxygen) to the oxygen electrode 5 of the fuel cell 1, water supply means 94 for supplying water to the oxygen electrode 5, gas-liquid mixing means (gas-liquid supply means) 95 for mixing air and water to be supplied to the oxygen electrode 5, regeneration means 96 for regenerating water supplied to the fuel cell 1, fuel exhaust means 97 for exhausting hydrogen supplied to the fuel electrode 4, and an output meter 98 for detecting and displaying the cell output of the fuel cell 1.

The cell unit 91 accommodates at least one fuel cell 1.

The fuel supply means (fuel supply line) 92 has a fuel source 921 (hydrogen storage), a pipe 922 connected at one end to the flow paths 71 of the fuel cell 1 and connected at its other end to the fuel source 921, and a valve 923 disposed in the pipe 922. The fuel source 921 is, for example, a cylinder.

The oxygen supply means (oxygen supply line) 93 has a pipe 931 connected at one end to the gas-liquid mixing means 95 and open to the atmosphere at its other end.

The water supply means (water supply line) 94 has a tank 941 for storing water, a pipe 942 connected at one end to the gas-liquid mixing means 95 and connected at its other end to the tank 941, a pump 943 disposed in the pipe 942, a hydraulic sensor 944 disposed on the pipe 942 downstream of the pump 943, a bypass line 945 branched from the pipe 942 and connected at one end downstream of the pump 943 and connected at its other end upstream of the pump 943, a valve 946 disposed in the bypass line 945, and water level detecting means 947 disposed on the tank 941. The water level detecting means 947 functions to detect and monitor the level of water stored in the tank 941, and includes a water level sensor 948 for detecting the level of water stored in the tank 941, and an alarm 949 connected to the water level sensor 948.

The gas-liquid mixing means 95 has a nozzle 951 to which one end of the pipe 942 is connected, and a chamber (gas-liquid supply chamber) 952 communicating with the flow paths 81 of the fuel cell 1. The pipe 931 of the oxygen supply means 93 communicates with the space 952.

The regeneration means (regeneration line) 96 has a manifold (lower manifold) 966 for collecting the water that has passed through the flow paths 81, a regeneration unit (condenser for condensing water from the air) 962 for separating the water and air that have passed through the flow paths 81, a pipe 961 connected at one end to the manifold 966 and connected at its other end to the regeneration unit 962, an exhaust line 963 connected at one end to the regeneration unit 962 and open to the atmosphere at its other end, a valve 964 disposed in the exhaust line 963, and a pipe 965 connected at one end to the regeneration unit 962 and connected at its other end to the tank 941.

The fuel exhaust means (fuel exhaust line) 97 has a pipe 971 connected at one end to the flow paths 71 with its other end in communication with the space 952, and a valve 972 disposed in the pipe 971.

The fuel source of the fuel supply means can also be, for example, a cylinder equipped with a hydrogen-storing alloy or the like. In this case, the fuel cell device should have the fuel source of the fuel supply means integrated with the regeneration unit of the regeneration means, whereby the hydrogen-storing alloy of the fuel source can be heated by the air (air which contains water) exhausted from the flow paths 81. In a fuel cell device equipped with a hydrogen-storing alloy as its fuel source, if the hydrogen-storing alloy of the fuel source can be heated by the air exhausted from the flow paths 81, the hydrogen can be supplied more smoothly from the hydrogen-storing alloy to the fuel cell 1. In addition, the air exhausted from the flow paths 81 is thereby cooled, and the water and air that have passed through the flow paths 81 can be more efficiently separated.

Alternatively, the fuel supply means may have, for example, stored methanol as the fuel source, which methanol is decomposed so as to generate hydrogen, and this hydrogen is supplied to the fuel electrode.

(9) Operation of the Fuel Cell Device 9

First, the pump 943 is started and the valves 923 and 964 are opened to a certain degree. When the valve 923 is opened to a certain degree, hydrogen is supplied from the fuel source 921 to the flow paths 71 through the pipe 922.

With the pump 943 running, water in the tank 941 is supplied to the nozzle 951 through the pipe 942 and water-supply pressure is detected by the hydraulic sensor 944. In the case where the water-supply pressure is high, an operator can adjust the water-supply pressure by lowering the output of the pump 943. The operator can also adjust the water-supply pressure by opening the valve 946 so that the water partially circulates between the bypass line 945 and the pipe 951.

The water supplied to the nozzle 951 is sprayed into the chamber 952 from the nozzle 951, becomes atomized, and efficiently cools the fuel cell 1. Air is supplied from the pipe 931 into the chamber 952. The water sprayed from the nozzle 951 and the air supplied from the pipe 931 are mixed in the chamber 952 and the mixed water and air are supplied to the flow paths 81.

The fuel cell 1 generates electricity in the cell unit 91 by reaction of the hydrogen supplied by the fuel supply means 92 with the air supplied by the oxygen supply means 93 and the cell output is displayed on the output meter 98.

The water and air that have passed through the fuel cell 1 (flow paths 81) are collected by the manifold 966, pass through the pipe 961 and flow into the regeneration unit 962 wherein the water is separated from the air and hydrogen contained in the air exhausted from the fuel cell 1 is removed.

The air from which the hydrogen has been removed is exhausted from the exhaust line 963.

The water in the regeneration unit 962 passes through the pipe 965 and flows into the tank 941 for reuse in the fuel cell 1. Furthermore, the water generated in the oxygen-reactive layer 51 with electricity generation and exhausted from the oxygen electrode 5 can be effectively used as cooling water.

The level of water held in the tank 941 is detected by the water level sensor 948. In the case where the water in the tank 941 reaches a predetermined level or higher, the alarm 949 is sounded. Therefore, the fuel cell device 9 can generate electricity more safely.

In stopping generation of electricity, the operation of the pump 943 is terminated, and the valves 923 and 964 are closed, whereby the operation of the fuel cell device 9 is stopped. Thereafter, the pressure in the flow paths 71 may be released by opening the valve 972. This action further enhances the safety of the fuel cell device 9.

EXAMPLES

In the following examples "wt %' means % by mass.

Example 1

A fuel cell wherein the water repellency of its fuel-diffusion layer was higher than that of its oxygen-diffusion layer was constructed as follows.

Fuel-Diffusion Layer

Fuel-diffusion-layer core portion

Material: Carbon cloth

Thickness: 360 $\mu$m

Fuel electrode water-repellent-material-containing inner sublayer

Material: (i) Carbon powder (average particle diameter 0.03 $\mu$m; "Denka Black" produced by Denki Kagaku Kogyo Co., Ltd.) 50 wt %; (ii) Polytetrafluoroethylene 50 wt % (The polytetrafluoroethylene was carried by (mixed with) the carbon powder)

Thickness: 30 $\mu$m

Fuel electrode water-repellent-material-containing outer sublayer

Constituent material: (i) Carbon powder (average particle diameter 0.03 $\mu$m; "Denka Black" produced by Denki Kagaku Kogyo Co., Ltd.) 50 wt %; (ii) Polytetrafluoroethylene 50 wt % (The polytetrafluoroethylene was carried by the carbon powder)
Thickness: 30 μm Fuel-Reactive Layer
Material: (i) Platinum catalyst (Pt 100 at %, average particle diameter 2 nm, specific surface area 100 m²/g) 35 wt %; (ii) Carbon powder (average particle diameter 0.03 μm) 35 wt %; (iii) Nafion (produced by Aldrich Corporation), shown below was same as this unless specified otherwise) 30 wt % (The platinum catalyst is carried by the carbon powder)
Thickness: 20 m Electrolyte Layer
Material: Nafion 112 (produced by Du Pont Corporation)
Thickness: 50 μm Oxygen Electrode Oxygen-Diffusion Layer
Oxygen-diffusion-layer core portion
Constituent material: Carbon cloth
Thickness: 360 μm Oxygen electrode water-repellent-material-containing inner sublayer
Material: (i) Carbon powder (average particle diameter 0.03 μm; "Denka Black" produced by Denki Kagaku Kogyo Co., Ltd.) 65 wt %; (ii) Polytetrafluoroethylene 35 wt % (The polytetrafluoroethylene was carried by the carbon powder)
Thickness: 20 μm Oxygen electrode water-repellent-material-containing outer sublayer
Material: (i) Carbon powder (average particle diameter 0.03 μm; "Denka Black" produced by Denki Kagaku Kogyo Co., Ltd.) 65 wt %; (ii) Polytetrafluoroethylene 35 wt % (The polytetrafluoroethylene was carried by the carbon powder)
Thickness: 20 μm Oxygen-Reactive Layer
Material: (i) Platinum catalyst (Pt 100 at %, average particle diameter 2 nm, specific surface area 100 m²/g) 35 wt %; (ii) Carbon powder (average particle diameter 0.03 μm) 35 wt % (The platinum catalyst was carried by the carbon powder); (iii) Nafion 30 wt %
Thickness: 20 μm The fuel electrode was produced by the following processes. First, carbon powder and polytetrafluoroethylene were mixed and dispersed in ethyl acetate (dispersion media given below) in the ratio given above. Then, the mixed dispersion liquid was coated on both surfaces of carbon cloth (fuel-diffusion-layer core portion), followed by drying. Then, this carbon cloth was hot-pressed at 360° C. and 60 kg/cm². Thereby, a fuel-diffusion layer with the above-mentioned thickness was obtained. Next, a mixed dispersion medium, which was obtained by mixing and dispersing a platinum catalyst, carbon powder, and Nafion in the above-mentioned ratio, was coated on one surface of the fuel-diffusion layer (on one water-repellent-material containing layer), followed by drying. Thereby, the fuel-reactive layer with the above-mentioned thickness was formed on the fuel-diffusion layer.

In a similar manner, an oxygen electrode with the above-described structure and composition was obtained.

Next, the fuel electrode, the electrolyte layer, and the oxygen electrode were stacked one on top of the other, in the following order: fuel-diffusion layer/fuel-reactive layer/electrolyte layer/oxygen-reactive layer/oxygen-diffusion layer. Then, the stack was hot-pressed at 130° C. and 40 kg/cm² to obtain a layered body.

The water contact angle (average for both surfaces) of the fuel-diffusion layer was 150°. The porosity of the fuel electrode water-repellent-material-containing inner sublayer was 45%. The porosity of the fuel electrode water-repellent-material-containing outer sublayer was 45%.

The water contact angle (average for both surfaces) of the oxygen-diffusion layer was 150°. The porosity of the oxygen electrode water-repellent-material-containing inner sublayer was 55%. The porosity of the oxygen electrode water-repellent-material-containing outer sublayer was 55%.

Example 2

A fuel cell the same as that of Example 1, except as explained below, was produced in the same manner described above. In this fuel cell, the water repellency of its fuel-diffusion layer was higher than that of its oxygen-diffusion layer.

Fuel Electrode Fuel-Diffusion Layer
Fuel electrode water-repellent-material-containing inner sublayer
Material: (i) Carbon powder (average particle diameter 0.03 μm; "Denka Black produced by Denki Kagaku Kogyo Co., Ltd.) 50 wt %; (ii) Polytetrafluoroethylene 50 wt % (The polytetrafluoroethylene was carried by the carbon powder)
Thickness: 30 μm Fuel electrode water-repellent-material-containing outer sublayer
Material: (i) Carbon powder (average particle diameter 0.03 μm; "Denka Black produced by Denki Kagaku Kogyo Co., Ltd.) 50 wt %; (ii) Polytetrafluoroethylene 50 wt % (The polytetrafluoroethylene was carried by the carbon powder)
Thickness: 30 μm Oxygen Electrode Oxygen-Diffusion Layer
Oxygen electrode water-repellent-material-containing inner sublayer
Material: (i) Carbon powder (average particle diameter 0.03 μm: "Vulcan XC-72 produced by Cabot Corporation) 60 wt %; (ii) Polytetrafluoroethylene 40 wt % (The polytetrafluoroethylene was carried by the carbon powder)
Thickness: 30 μm Oxygen electrode water-repellent-material-containing Outer Sublayer
Material: (i) Carbon powder (average particle diameter 0.03 μm; "Vulcan XC-72 produced by Cabot Corporation) 60 wt %; (ii) Polytetrafluoroethylene 40 wt % (The polytetrafluoroethylene was carried by the carbon powder)
Thickness: 30 μm The present example used "Denka Black", produced by Denki Kagaku Kogyo Co., Ltd. as the carbon powder for the fuel electrode water-repellent-material-containing inner sublayer and for the fuel electrode water-repellent-material-containing outer sublayer, and used carbon having lower repellency, "Vulcan XC-72" produced by Cabot Corporation, for the oxygen-electrode water-repellent-material-containing inner sublayer and for the oxygen electrode water-repellent-material-containing outer sublayer.

The water contact angle (average for both surfaces) of the fuel-diffusion layer was 150°. The porosity of the fuel electrode water-repel lent-material-containing inner and outer sublayers was 45%.

The water contact angle (average for both surfaces) of the oxygen-diffusion layer was 130°. The porosity of the oxygen electrode water-repellent-material-containing inner and outer sublayers was 55%.

Comparative Example

A fuel cell the same as that of Example 1 except as given below was produced in the same manner as described above. In this fuel cell, the water repellency of the fuel-diffusion layer and that of the oxygen-diffusion layer were set equal to each other.

Fuel Electrode Diffusion Layer

Fuel electrode water-repellent-material-containing inner sublayer

Material: (i) Carbon powder 65 wt %; (ii) Polytetrafluoroethylene 35 wt %

Thickness: 30 μm

Fuel electrode water-repellent-material-containing outer sublayer

Material: (i) Carbon powder 65 wt %; (ii) Polytetrafluoroethylene 35 wt %

Thickness: 30 μm

Oxygen Electrode Oxygen-Diffusion Layer

Oxygen electrode water-repellent-material-containing inner sublayer

Material: (i) Carbon powder 65 wt %; (ii) Polytetrafluoroethylene 35 wt %

Thickness: 30 μm

Oxygen electrode water-repellent-material-containing outer sublayer

Material: (i) Carbon powder 65 wt %; (ii) Polytetrafluoroethylene 35 wt %

Thickness: 30 μm

Evaluation

Cell frames (a fuel electrode-side cell frame and an oxygen electrode-side cell frame) were fixed on the layered body that was obtained in each of the examples and the comparative example to assemble the individual fuel cells.

Next, two fuel cells were connected in parallel as a cell unit. Then, the cell unit was installed in a fuel cell device as shown in FIG. 2. Thus, fuel cell devices respectively equipped with the fuel cells obtained in each example and comparative example were obtained.

Next, the fuel cell devices were operated with supply pressure of hydrogen gas at 0.9 kgf/cm² and water supply to the oxygen electrodes at 0.66 mg/cm·sec to generate electricity. Then, the current density-voltage relationship of each fuel cell was measured.

Figure 3:
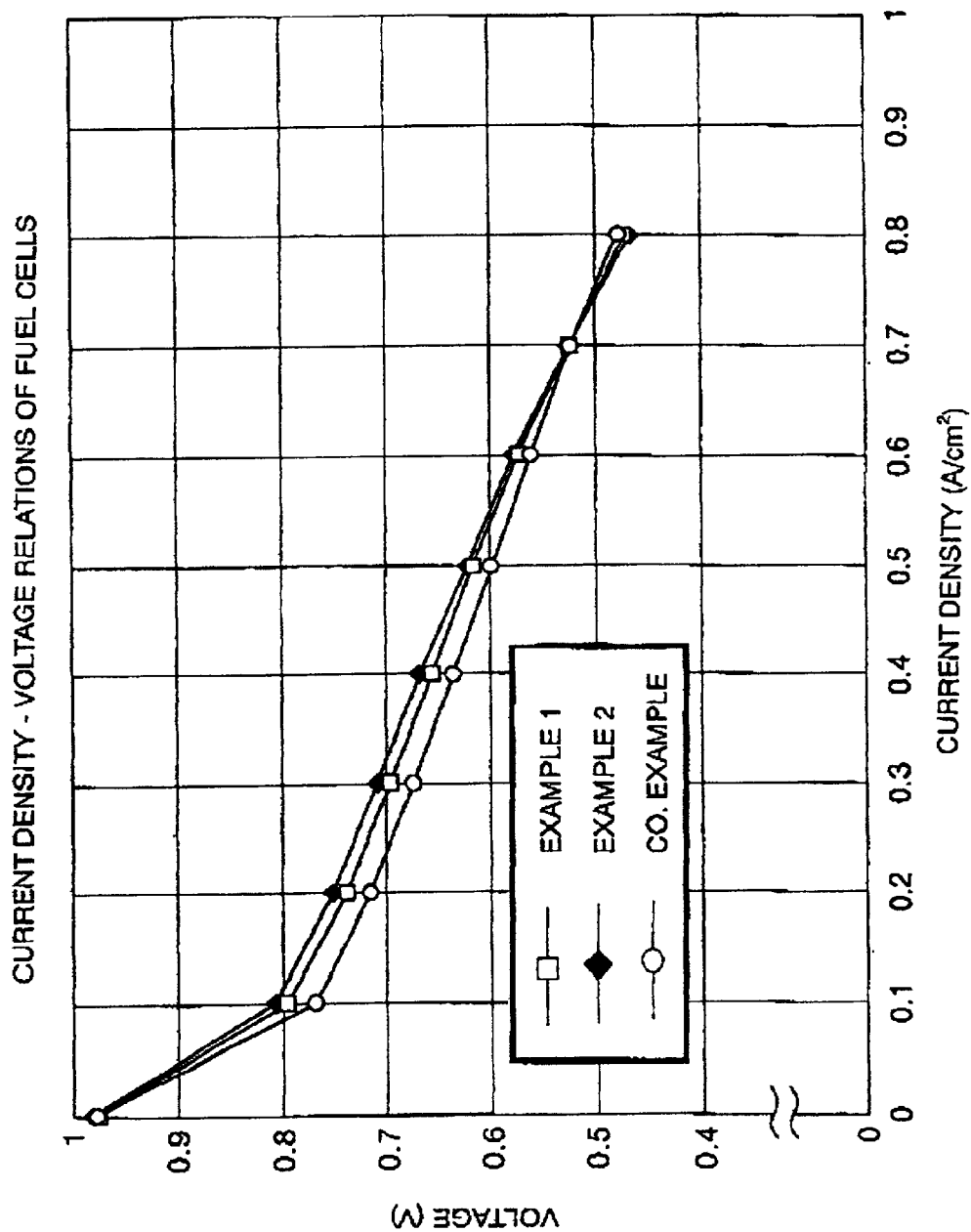
FIG. 3 is a graph showing current density versus voltage for the fuel cells in the examples.

As shown in FIG. 3 the current densities of the fuel cells of the examples of the present invention were higher than that of the fuel cell of the comparative example in the normal operating voltage range of fuel cells.

As described above, according to the present invention, output of fuel cells can be enhanced and thus, fuel cells and fuel cell devices with enhanced output can be provided.

Finally, it is to be noted that present invention is no way limited to the examples described above, and many changes and additions may be made without departing from the spirit of the present invention, which is defined by the following claims.

What is claimed is:

1. A fuel cell, comprising:
  a fuel electrode a fuel-diffusion layer for diffusing fuel and a fuel-reactive layer for reaction of the fuel, said fuel-reactive layer having an outer surface contacting the fuel diffusion layer, said fuel-diffusion layer containing a water-repellent material,
  an oxygen electrode including an oxygen-diffusion layer for diffusing oxygen and an oxygen-reactive layer for reaction of the oxygen, said oxygen-reactive layer having an outer surface contacting the oxygen-diffusion layer, and wherein said oxygen-diffusion layer contains a water-repellent material and has less water-repellency than said fuel-diffusion layer; and
  an electrolyte layer, said fuel-reactive layer arranged between said electrolyte layer and said fuel-diffusion layer and said oxygen-reactive layer arranged between said electrolyte layer and said oxygen-diffusion layer.

2. The fuel cell as claimed in claim 1, wherein each of the fuel-diffusion layer and the oxygen-diffusion layer are formed of plural sublayers, one of which contains the water-repellent material.

3. The fuel cell as claimed in claim 1, wherein the content of the water-repellent material in the fuel-diffusion layer is larger than that of the water-repellent material in the oxygen-diffusion layer.

4. The fuel cell as claimed in claim 1, wherein the content of the water-repellent material in the fuel-diffusion layer is larger than that of the water-repellent material in the oxygen-diffusion layer by at least 5 wt %.

5. The fuel cell as claimed in claim 1, wherein the content of the water-repellent material fuel-diffusion layer is 20 to 80 wt %.

6. The fuel cell as claimed in claim 1, wherein the content of the water-repellent material oxygen-diffusion layer is 15 to 65 wt %.

7. The fuel cell as claimed in claim 2, wherein the sublayers containing the water-repellent material in the fuel-diffusion layer and in the oxygen-diffusion layer contain an electrically conductive material, and wherein the electrically conductive material in fuel-diffusion layer has higher water-repellency than that of the electrically conductive material in the oxygen-diffusion layer.

8. The fuel cell as claimed in claim 2, wherein the water-repellent material is carried by a particulate electrically conductive material.

9. The fuel cell as claimed in claim 2, wherein the fuel-diffusion layer has water-repellent-material-containing sublayers at both its sides.

10. The fuel cell as claimed in claim 2, wherein the oxygen-diffusion layer has water-repellent-material-containing sublayers at both its sides.

11. The fuel cell as claimed in claim 1, wherein the water contact angle on the surface of the fuel-diffusion layer is larger than the water contact angle on the surface of the oxygen-diffusion layer by at least 5°.

12. The fuel cell as claimed in claim 1, wherein the water contact angle on the surface of the fuel-diffusion layer is 100 to 160°.

13. The fuel cell as claimed in claim 1, wherein the water contact angle on the surface of the oxygen-diffusion layer is 90 to 150°.

14. The fuel cell as claimed in claim 1, wherein the fuel cell uses hydrogen as fuel.

15. A fuel cell device, comprising:
  a fuel cell main body including:
  (a) a fuel electrode including a fuel-diffusion layer for diffusing fuel and a fuel-reactive layer for reaction of the fuel, said fuel-reactive layer contacting the fuel-diffusion layer and said fuel-diffusion layer containing a water-repellent material;
  (b) an oxygen electrode including an oxygen-diffusion layer for diffusing oxygen and an oxygen-reactive layer for reaction of the oxygen, said oxygen-reactive layer contacting the oxygen-diffusion layer, and wherein said oxygen-diffusion layer contains a water-repellent material and has less water-repellency than said fuel-diffusion layer; and (c) an electrolyte layer, said fuel-reactive layer arranged between said electrolyte layer and said fuel-diffusion layer and said oxygen-reactive layer arranged between said electrolyte layer and said oxygen-diffusion layer;

fuel supply means for supplying fuel to the fuel electrode; and oxygen supply means for supplying gas containing oxygen gas to the oxygen electrode.

16. The fuel device as claimed in claim 15, further comprising water supply means for supplying water to the oxygen electrode.

17. The fuel cell as claimed in claim 1 wherein said fuel-reactive layer contains a catalyst that promotes hydrogen oxidation and wherein said oxygen-reactive layer contains a catalyst that promotes hydrogen oxidation.

18. The fuel cell device as claimed in claim 15 wherein said fuel-reactive layer contains a catalyst that promotes hydrogen oxidation and wherein said oxygen-reactive layer contains a catalyst that promotes oxygen reduction.

* * * * *

UNITED STATES PATENT AND TRADEMARK OFFICE
CERTIFICATE OF CORRECTION

PATENT NO. : 6,797,426 B2
DATED : September 28, 2004
INVENTOR(S) : Yamamoto et al.

It is certified that error appears in the above-identified patent and that said Letters Patent is hereby corrected as shown below:

Column 5,
Line 48, delete "repellency", second instance.

Column 14,
Line 31, "53" should read -- 5 --.

Column 22,
Lines 26 and 29, after "material" insert -- in the --.

Column 23,
Line 13, delete "gas".

Column 24,
Line 1, after "fuel" insert -- cell --;
Line 7, delete "hydrogen oxidation" insert -- oxygen reduction --.

Signed and Sealed this

Thirty-first Day of May, 2005

JON W. DUDAS
*Director of the United States Patent and Trademark Office*